(12) United States Patent
Messing et al.

(10) Patent No.: US 11,181,092 B2
(45) Date of Patent: Nov. 23, 2021

(54) ROTOR BLADE FOR A WIND TURBINE AND METHOD

(71) Applicant: Wobben Properties GmbH, Aurich (DE)

(72) Inventors: Ralf Messing, Aurich (DE); Mustafa Onur Kimilli, Munich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/970,586

(22) PCT Filed: Feb. 11, 2019

(86) PCT No.: PCT/EP2019/053226
§ 371 (c)(1),
(2) Date: Aug. 17, 2020

(87) PCT Pub. No.: WO2019/162114
PCT Pub. Date: Aug. 29, 2019

(65) Prior Publication Data
US 2021/0108609 A1    Apr. 15, 2021

(30) Foreign Application Priority Data

Feb. 20, 2018  (DE) ..................... 10 2018 103 732.5

(51) Int. Cl.
*F03D 1/06* (2006.01)
(52) U.S. Cl.
CPC ......... *F03D 1/0633* (2013.01); *F03D 1/0658* (2013.01); *F03D 1/0675* (2013.01); *F05B 2240/302* (2013.01)
(58) Field of Classification Search
CPC .... F03D 1/0633; F03D 1/0641; F03D 1/0675; F03D 1/0683; F05D 2240/302; F05B 2250/10–36; F05B 2250/70–73
See application file for complete search history.

(56) References Cited

U.S. PATENT DOCUMENTS 8,777,573 B2 * 7/2014 Hibbard ................ F03D 1/0675
416/132 B
9,759,185 B2    9/2017 Bohlen
(Continued)

FOREIGN PATENT DOCUMENTS

DE    102012206109 B3    9/2013
DE    102014206670 A1    10/2015
(Continued)

*Primary Examiner* — Courtney D Heinle
*Assistant Examiner* — Sang K Kim
(74) *Attorney, Agent, or Firm* — Seed Intellectual Property Law Group LLP (57) ABSTRACT

A rotor blade for a wind turbine, a wind turbine, a wind park and a method for configuring a rotor blade which is divided in two. A rotor blade for a wind turbine, which rotor blade extends in the longitudinal direction from a blade connection to a blade tip with a variable profile depth, wherein the rotor blade is divided at a separating point and has a separating point profile depth at the separating point, a relative blade length of the rotor blade, starting from the blade connection, is defined in a blade length value range between 0% to 100%, the separating point is arranged in a blade length value range between 25% and 50%, a rotor blade section facing the blade connection and a rotor blade section facing away from the blade connection can be connected at this separating point for correct operation of the rotor blade, a depth ratio which is composed of the variable profile depth and the separating point profile depth is defined, a development index is defined as a gradient of the depth ratio in the direction of the relative blade length, and the development index in the region of the separating point is less than 1.

19 Claims, 5 Drawing Sheets

(56) References Cited

U.S. PATENT DOCUMENTS

| | | | |
|---|---|---|---|
| 9,982,654 B2 * | 5/2018 | Ruijter | F03D 1/0633 |
| 10,253,751 B2 * | 4/2019 | Rob | F03D 7/04 |
| 2018/0274518 A1 | 9/2018 | Spieth et al. | |
| 2019/0032631 A1 | 1/2019 | Hoffmann | |
| 2020/0088169 A1 * | 3/2020 | Lund-Laverick | F03D 1/0675 |
| 2020/0248671 A1 * | 8/2020 | Messing | F03D 1/0675 |
| 2021/0222668 A1 * | 7/2021 | Lipka | F03D 1/0633 |

FOREIGN PATENT DOCUMENTS

| | | | | |
|---|---|---|---|---|
| DE | 102015116634 A1 | 4/2017 | | |
| DE | 102016201114 A1 | 7/2017 | | |
| EP | 1978245 A1 | 10/2008 | | |
| EP | 2634417 A2 | 9/2013 | | |
| EP | 2910772 A1 * | 8/2015 | | F03D 1/0641 |
| ES | 2510893 A1 | 10/2014 | | |
| FR | 1187166 A | 9/1959 | | |
| WO | 2010/086297 A2 | 8/2010 | | |

* cited by examiner

ROTOR BLADE FOR A WIND TURBINE AND METHOD

BACKGROUND

Technical Field

The present invention relates to a rotor blade for a wind turbine, to a wind turbine, to a wind park and to a method for configuring a rotor blade which is divided in two.

Description of the Related Art

Wind turbines of the type specified at the beginning are known. The currently most common type of wind turbine is what is referred to as the horizontal axis wind turbine, which is usually equipped with three rotor blades, wherein wind turbines with one, two, four or more rotor blades are also possible. Such wind turbines have increasingly large designs in order, on the one hand, to be able to achieve a higher rated power and, on the other hand, to permit better utilization of the wind, wherein ultimately the objective is to increase the economic efficiency of wind turbines.

Relatively large designs of wind turbines can have, for example, relatively large hubs or relatively large rotor diameters or rotor blade lengths. As a result, such wind turbines can have relatively large generators and/or relatively large feed powers. However, in particular the relatively large rotor diameters also result quite generally in relatively large forces and torques at the wind turbine. The relatively large forces are caused, for example, by the relatively large centrifugal forces and/or bending torques of the relatively large rotor blades.

Since rotor blades are generally transported from one product location to an installation site of the wind turbine and mounted on the hub there, it is frequently necessary or advantageous to use divided rotor blades, in particular in the case of rotor blades with large longitudinal extents. Divided rotor blades are easier to transport than undivided rotor blades. Divided rotor blades, which therefore have two or more adjacent sections in the longitudinal direction, are known, for example, from DE 10 2014 206 670 A1. In particular, divided rotor blades may be necessary for installation sites in wooded areas or mountainous regions for transportation to the installation site to be at all possible.

A disadvantage of conventional rotor blades which are divided in two is that owing to the separating point they do not have an aerodynamically optimum profile, or only have one to a limited degree. Owing to this, the efficiency or the yield of the wind turbine is reduced and furthermore force progressions and/or torque progressions are influenced negatively.

The German Patent and Trademark Office has conducted searches in the following prior art in the priority application for the present application: DE 10 2012 206 109 B3; DE 10 2015 116 634 A1 and DE 10 2016 201 114 A1.

BRIEF SUMMARY

Provided is a rotor blade for a wind turbine, a wind turbine, a wind park and a method for configuring a rotor blade which is divided in two, which reduce or eliminate one or more of the abovementioned disadvantages. Provided are techniques which reduce the system loads on a wind turbine and/or increases a yield of a wind turbine.

According to a first aspect of the present invention, provided is a rotor blade for a wind turbine, which rotor blade extends in the longitudinal direction from a blade connection to a blade tip with a variable profile depth, wherein the rotor blade is divided at a separating point and has a separating point profile depth at the separating point, a relative blade length of the rotor blade, starting from the blade connection, is defined in a blade length value range between 0% to 100%, the separating point is arranged in a blade length value range between 25% and 50%, a rotor blade section facing the blade connection and a rotor blade section facing away from the blade connection can be connected at this separating point for correct operation of the rotor blade, a depth ratio which is composed of the variable profile depth and the separating point profile depth is defined, a development index is defined as a gradient of the depth ratio in the direction of the relative blade length, and the development index in the region of the separating point is less than −1.

The rotor blade preferably has an idealized planar extent which is formed by a longitudinal extent in the longitudinal direction and by the profile depth which runs essentially orthogonally with respect to the latter. The profile depth describes, in particular, the extent of the rotor blade from a leading edge to a trailing edge of the rotor blade. The profile depth is accordingly configured in a variable fashion, since the extent of the rotor blade is essentially not constant in the direction of the profile depth. Nevertheless, the rotor blade can also have sections in which the profile depth is essentially constant. The rotor blade has a rotor blade thickness orthogonally with respect to the longitudinal extent and orthogonally with respect to the profile depth.

Along the longitudinal direction, the rotor blade is divided into two sections which abut at the separating point. The separating point can extend completely or partially essentially orthogonally with respect to the longitudinal direction of the rotor blade. The separating point preferably has a dividing plane which corresponds to an abutment face of one or both rotor blade sections. The separating point can be arranged in such a way that the longitudinal direction of the rotor blade is oriented parallel to a surface orthogonal of the dividing plane of the separating point. The dividing plane has in this case essentially extents in the direction of the profile depth and of the rotor blade thickness.

Alternatively or additionally it is preferred that the dividing plane of the separating point is oriented completely or partially inclined with respect to the longitudinal direction of the rotor blade. An inclined dividing plane of the separating point means, in particular, that the dividing plane extends, on the one hand, in the direction of the rotor blade thickness but also in the longitudinal direction of the rotor blade and in the direction of the profile depth. Moreover, the separating point can also have other geometries, for example can extend in a zigzag shape.

At the separating point, the variable profile depth assumes a value, specifically the separating point profile depth. If the progression of the separating point does not permit a specific value for the determination of the profile depth or permits a plurality of values for the separating point profile depth, it is preferred to form a mean value from the possible separating point profile depths. This can be the case, for example, with inclined dividing planes or separating points with a zigzag shape. Moreover, a minimum separating point profile depth or a maximum separating point profile depth can also be used.

The relative blade length always assumes a blade length value between 0% and 100%. A blade length value of 0% is preferably assigned to the blade connection. A blade length value of 100% is also preferably assigned to the blade tip.

The separating point is arranged in a blade length value range between 25% and 50%. That is to say in the case of a rotor blade which has, for example, a length of 50 meters, the separating point is at a distance between 10 meters and 20 meters from the blade connection.

As a result of the division of the rotor blade, the rotor blade has essentially two rotor blade sections, specifically the rotor blade section facing the blade connection and the rotor blade section facing way from the blade connection. The rotor blade section facing the blade connection is the rotor blade section which, on the one hand, adjoins the separating point and, in addition to this, has the blade connection or faces it. During correct operation of the rotor blade, the rotor blade section facing the blade connection additionally faces a hub of a wind turbine and therefore comprises the proximal end of the rotor blade. The rotor blade section facing away from the blade connection is that rotor blade section which, on the one hand, adjoins the separating point and, in addition to this, has the blade tip or adjoins this blade tip. The rotor section facing away from the blade connection therefore comprises the distal end of the rotor blade.

The depth ratio results from the variable profile depth and the separating point profile depth. The depth ratio is therefore determined from the variable profile depth and the constant separating point profile depth. The depth ratio at the separating point is therefore generally always equal to 1. In general, the depth ratio in the blade length value range of 0% up to the separating point has a value greater than 1. In the region from the separating point to a blade length value of 100% the depth ratio generally has a value of less than 1.

The development index is determined as a gradient of the depth ratio in the direction of the relative blade length. The development index is therefore calculated, in particular, by differentiating the depth ratio with respect to the relative blade length. In the region of the separating point, the development index is less than −1. This means that the depth ratio in the region of the separating point decreases to a comparatively high degree.

One or more embodiments are based, inter alia, on the realization that in divided rotor blades the system loads are reduced by a rapid decrease in the profile depth from the separating point toward the blade tip. However, for mounting a minimum absolute blade thickness, which influences the aerodynamic design of the rotor blade, has to be maintained at the separating point. In order to be able to effectively utilize the logistical advantage of the divided rotor blade without reducing it again with the disadvantage of greatly increased system loads, a development index in the region of the separating point of less than −1 is proposed.

The region of the separating point can extend, inter alia, in the longitudinal direction of the rotor blade. The region of the separating point preferably extends in the longitudinal direction of the rotor blade from a lower region boundary, facing the blade connection, to an upper region boundary, facing away from the blade connection. The lower region boundary is preferably spaced apart from the separating point in the direction of the blade connection with an extent which is less than 0.1%, 0.5%, 1%, 2%, 5% and/or 7% of the relative blade length. The upper region boundary is preferably spaced apart from the separating point in the direction of the blade tip with an extent which is less than 0.1%, 0.5%, 1%, 2%, 5% and/or 7% of the relative blade length.

According to a further preferred implementation variant of the rotor blade there is provision that the separating point is arranged in a blade length value range between 32% and 40%.

One or more embodiments are also based on the realization that it is advantageous to reduce the profile depth in the rotor blade section facing away from the blade connection as quickly as possible in order to be able to implement structural improvements to the rotor blade. In particular, in this way the disadvantage of an increased rotor blade mass of divided rotor blades can be compensated. In addition, the efficiency of the rotor blade is improved so that the yield can be increased.

Furthermore, one or more embodiments are based on the realization that reducing the relative rotor blade thickness, that is to say a ratio of the rotor blade thickness to the profile depth, results in aerodynamic advantages. The relative rotor blade thickness at the separating point is preferably in the thickness range from 0.4 to 0.5. In addition, a design index is preferably defined as a definite integral of the relative rotor blade thickness over a range of the relative blade length, wherein a lower limit of the integral is defined at a position of 20% of the relative blade length, and the design index can be evaluated for any desired values of the upper limit, wherein the design index for an upper limit of 45% of the relative blade length is at least 0.1 and/or the design index for an upper limit of 80% of the relative blade length is at least 0.2.

In one preferred implementation variant of the rotor blade there is provision that the development index in the blade length value range between 25% and 50%, in particular in the blade length value range between 32% and 40%, is minimal in the region of the separating point. Therefore, in this embodiment the development index has a local minimum in the region of the separating point. Irrespective of this, development indices of other rotor blade sections are possible which assume a value which is less than the value at the separating point as long as these rotor blade sections do not lie in the blade length value range between 25% and 50%. As a result of the low development index in the blade length value range between 25% and 50%, an aerodynamically advantageous rotor blade is obtained. In particular, with this rotor blade the system loads are advantageously reduced.

According to a further preferred implementation variant of the rotor blade there is provision that the development index in the region of the separating point lies in an index value range between −3 and −1, particularly preferably in an index value range between −2.5 and −2. In addition, the development index in the blade length value range between 50% and 90%, in particular between 55% and 80%, can have a rising value. Furthermore, it is preferred that the development index in the blade length value range between 25% and 50%, in particular between 32% and 40%, is less than −1. In addition, it can be preferred that the development index in the blade length value range between 25% and 50%, in particular between 32% and 40%, is less than −1.5 and/or −2 and/or −2.2 and/or −2.4.

A further preferred development of the rotor blade is distinguished by the fact that in the blade length value range between 60% and 80%, the development index lies in the index value range between −1.1 and −0.5. It is also preferred that the development index decreases from the relative blade length of 25% toward the separating point, and/or the development index increases from the separating point toward the relative blade length of 90%. A rotor blade with a development index according to one or more of the implementation variants described above results in a rotor blade which is optimized further. In particular, each individual implementation variant brings about improved aerodynamics of the rotor blade. As a result, the system loads are reduced further. At the same time, the strength of the rotor blade can be improved and/or the yield increased.

In a further embodiment, the depth ratio in the blade length value range between 5% and 20%, in particular between 10% and 20%, can lie in a depth value range between 1.1 and 1.3, in particular between 1.15 and 1.25, and/or the depth ratio in the blade length value range between 90% and 100%, in particular between 95% and 100%, can lie in a depth value range between 0.1 and 0.2, and/or the depth ratio in the blade length value range between 40% and 70% can lie in a depth value range between 0.4 and 0.75.

In a further preferred embodiment of the rotor blade there is further provision that a longitudinal extent of the rotor blade in the longitudinal direction is at least 40 meters. Moreover, a longitudinal extent of the rotor blade in the longitudinal direction can be at least 40 meters. In addition, according to one or more of the implementation variants mentioned above the rotor blade is in particular suitable for forming a weak-wind wind turbine in combination with the further necessary components. The rotor blade is preferably a weak-wind rotor blade, wherein the rotor blade is preferably embodied in such a way that it is suitable for a wind turbine with a rated power of greater than or equal to 4 megawatts.

According to a further aspect of the present invention, provided is a wind turbine having at least one rotor blade according to one of the implementation variants which is described above. The wind turbine is preferably embodied as a weak-wind wind turbine. Moreover, the wind turbine can have a rated power of greater than or equal to 4 megawatts.

In addition, provided is a wind park having two or more wind turbines according to the preceding claim. The wind park can comprise one, two or more weak-wind wind turbines. Furthermore, it is preferred that at least one of the two or more wind turbines has a rated power of greater than or equal to 4 megawatts.

According to a further aspect, provided is a method for configuring a rotor blade which is divided in two, for a wind turbine, which rotor blade extends from a blade connection to a blade tip with a variable profile depth, wherein the rotor blade is divided in the longitudinal direction at a separating point and has a separating point profile depth at the separating point, a relative blade length of the rotor blade, starting from a blade connection, is defined in a blade length value range between 0% to 100%, a rotor blade section facing the blade connection and a rotor blade section facing away from the blade connection can be connected at the separating point for correct operation of the rotor blade, a depth ratio composed of the profile depth and the separating point profile depth is defined, comprising specifying the separating point in a blade length value range between 25% and 50%, and using a development index which is defined as a gradient of the depth ratio in the direction of the relative blade length, wherein the development index in the region of the separating point is less than −1.

Furthermore, it is preferred that the development index in the blade length value range between 25% and 50% is minimal in the region of the separating point.

In a further preferred implementation variant of the method there is provision that in the blade length value range between 50% and 90%, in particular between 55% and 80%, has a rising value, and/or in the region of the separating point lies in an index value range between −3 and −1, particularly preferably in an index value range between −2.5 and −2.

The region of the separating point can extend, inter alia, in the longitudinal direction of the rotor blade. The region of the separating point preferably extends in the longitudinal direction of the rotor blade from a lower region boundary, facing the blade connection, to an upper region boundary, facing away from the blade connection. The lower region boundary is preferably spaced apart from the separating point in the direction of the blade connection with an extent which is less than 0.1%, 0.5%, 1%, 2%, 5% and/or 7% of the relative blade length. The upper region boundary is preferably spaced apart from the separating point in the direction of the blade tip with an extent which is less than 0.1%, 0.5%, 1%, 2%, 5% and/or 7% of the relative blade length.

Furthermore, it may be preferred that in the blade length value range between 60% and 80%, the development index lies in the index value range between −1.1 and −0.5.

It is also preferred that the development index decreases from the relative blade length of 20%, in particular of 25%, toward the separating point, and/or the development index increases from the separating point toward the relative blade length of 90%.

The method and its possible developments have features and/or method steps which make them particularly suitable to be used for a rotor blade and its developments. For further advantages, implementation variants and implementation details of these further aspects and of their possible developments, reference is also made to the description given above of the corresponding features and developments of the rotor blade.

BRIEF DESCRIPTION OF THE SEVERAL VIEWS OF THE DRAWINGS

Further advantages and preferred embodiments are described in more detail below with reference to the exemplary embodiments of the appended figures, of which.

DETAILED DESCRIPTION

Figure 1:
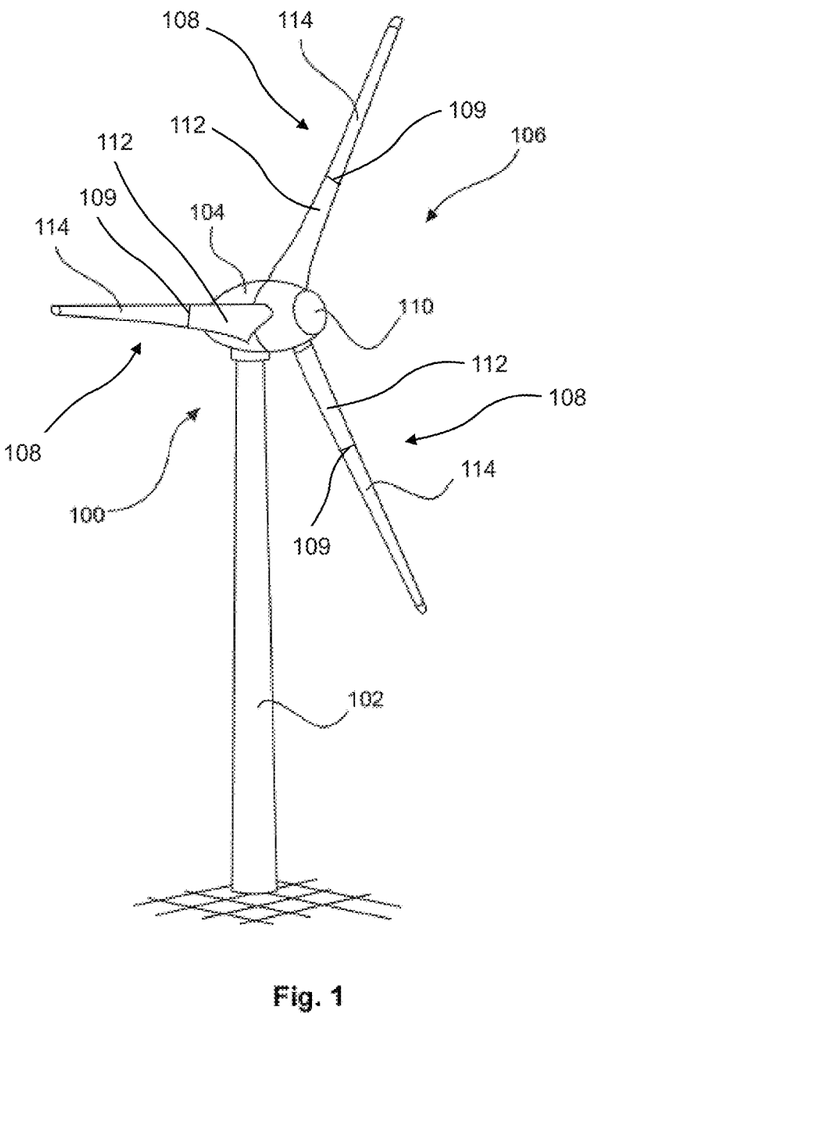
FIG. 1 shows a schematic and exemplary view of a wind turbine.

FIG. 1 shows a wind turbine 100 with a tower 102 and a nacelle 104. A rotor 106 with three rotor blades 108 and a spinner 110 is arranged on the nacelle 104. The rotor 106 is made to move in a rotational fashion by the wind during operation and as a result drives a generator in the nacelle 104. The spinner 110 encases a rotor hub (not shown) of the rotor 106.

The rotor blades 108 are each divided in two and have a separating point 109. A rotor blade section 112 facing the blade connection and a rotor blade section 114 facing away from the blade connection respectively abut with one another at the separating point 109. A rotor blade 108 is formed essentially by the rotor blade section 112 facing the blade connection and the rotor blade section 114 facing away from the blade connection. In preferred implementation variants of the rotor blades 108, there is also the possibility of providing two or more separating points 109 per rotor blade 108.

Divided rotor blades 108 are easier to transport than undivided rotor blades 108 and also provide advantages in production, for example through the use of winding technology. In particular, it is preferred that the rotor blade sections 112 facing the blade connection are manufactured by means of winding technology, which permits rapid and cost-effective production. However, a known disadvantage of such divided rotor blades 108 is the generally higher overall mass of the rotor blade 108 in comparison with undivided rotor blades of similar dimensions. In particular it is preferred that the rotor blade section 114 facing away from the blade connection has a low weight. The rotor blade section 112 facing the blade connection and the rotor blade section 114 facing away from the blade section can be connected to one another, for example, on the inside of the blade, wherein, in particular, screwed connections are preferred. So that such a connection can be realized in practice, it is particularly preferred that the rotor blade 108 has a rotor blade thickness of 1.7 to 1.8 meters at the separating point 109. For the definition of the rotor blade thickness, reference is made to the following description in FIG. 3. The extent, in particular in the interior of the rotor blade in the direction of the rotor blade density, is preferably 1.7 m or more, in order to permit simple mounting.

The rotor blades 108 have preferably been configured with a development index. The development index results from the gradient of a depth ratio in the direction of the relative blade length. The depth ratio results from the variable profile depth with respect to the separating point profile depth.

It has proven particularly preferable to configure the development index in the region of the separating point 109 in such a way that it assumes a value of less than −1. Such a rotor blade 108 has a profile depth progression which has a strong decrease in the profile depth in the region of the separating point. This makes it possible to obtain a rotor blade which takes into account both the expected system loads, the aerodynamic effectiveness and also the overall mass of the rotor blade 108 as a whole appropriately.

Figure 2:
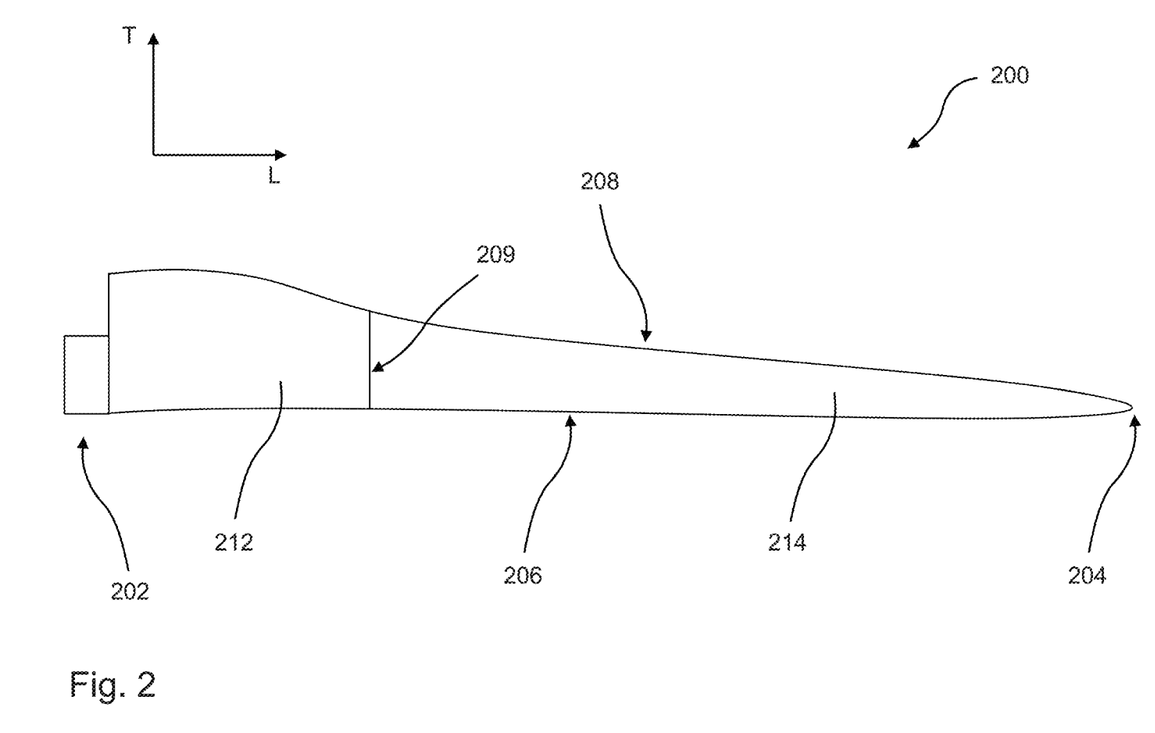
FIG. 2 shows a schematic and exemplary plan view of a rotor blade.

FIG. 2 shows an exemplary and schematic illustration of a further preferred implementation variant of a rotor blade 200. The rotor blade 200 extends in the longitudinal direction L from a blade connection (or root) 202 to a blade tip 204. It is here a rotor blade which is divided in two and which has a separating point 209. The section of the rotor blade 200 which adjoins the separating point 209 and the blade connection 202 or comprises the blade connection 202 is the rotor blade section 212 facing the blade connection. The further rotor blade section which faces away from the blade connection and which adjoins the blade tip 204 or comprises the blade tip 204 is the rotor blade section 214 facing away from the blade connection. In the direction of the profile depth T, the rotor blade extends from a leading edge 206 to a trailing edge 208. The profile depth generally corresponds to the distance between the leading edge 206 and the trailing edge 208. The rotor blade 200 in FIG. 2 can be, for example, one of the rotor blades 108 in FIG. 1.

Figure 3:
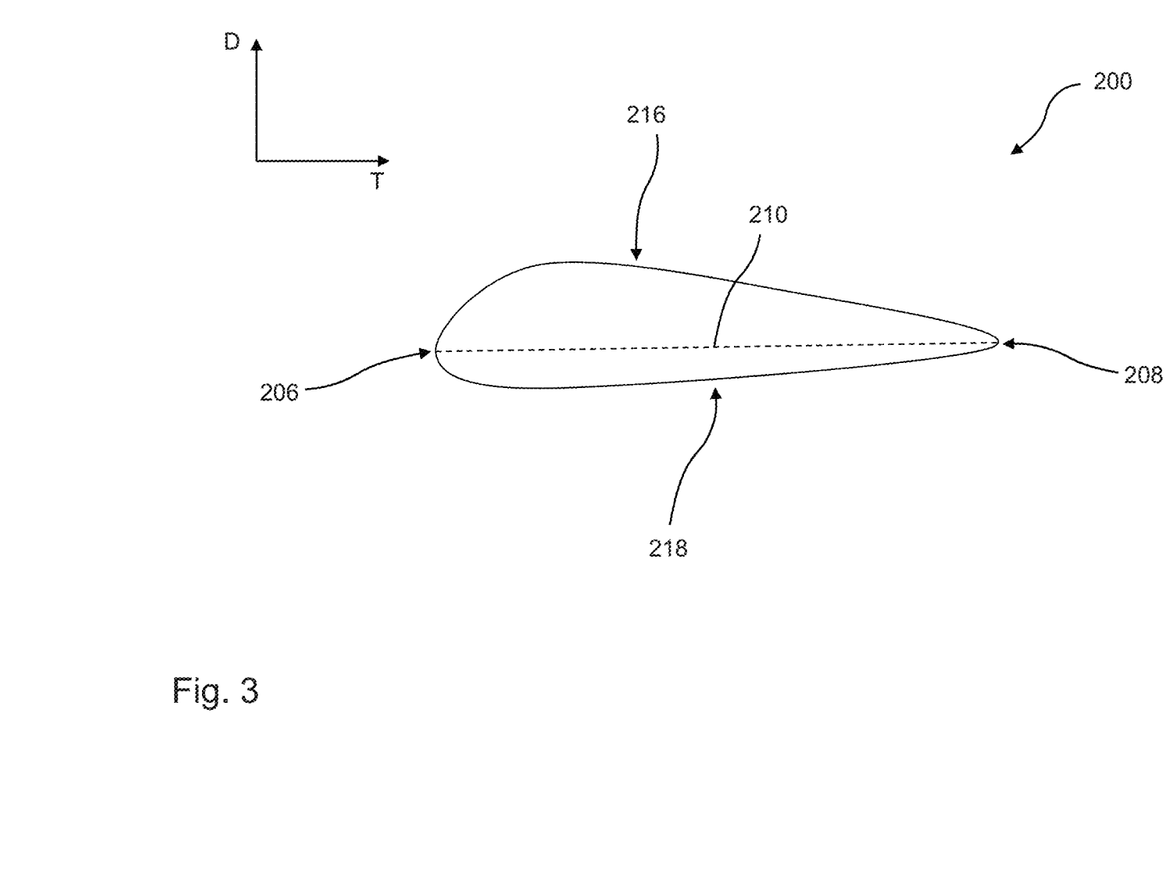
FIG. 3 shows a schematic and exemplary cross-sectional view of the rotor blade from FIG. 2.

The cross section of the rotor blade 200 shown in FIG. 3 represents a cross section in the region of the separating point. The profile depth which is present at this separating point is the separating point profile depth 210. As a result of the corresponding geometric configuration of the rotor blade 200, the rotor blade has a suction side 216 and a pressure side 218. The rotor blade thickness D runs orthogonally with respect to the direction of the profile depth T of the rotor blade 200 and the longitudinal direction L of the rotor blade 200. It should be noted that in contrast to the example of the rotor blade 200 which is shown in FIG. 3, profiles with obtuse or thick trailing edges, referred to as flatback profiles, are also used in the region of the separating point.

Figure 4:
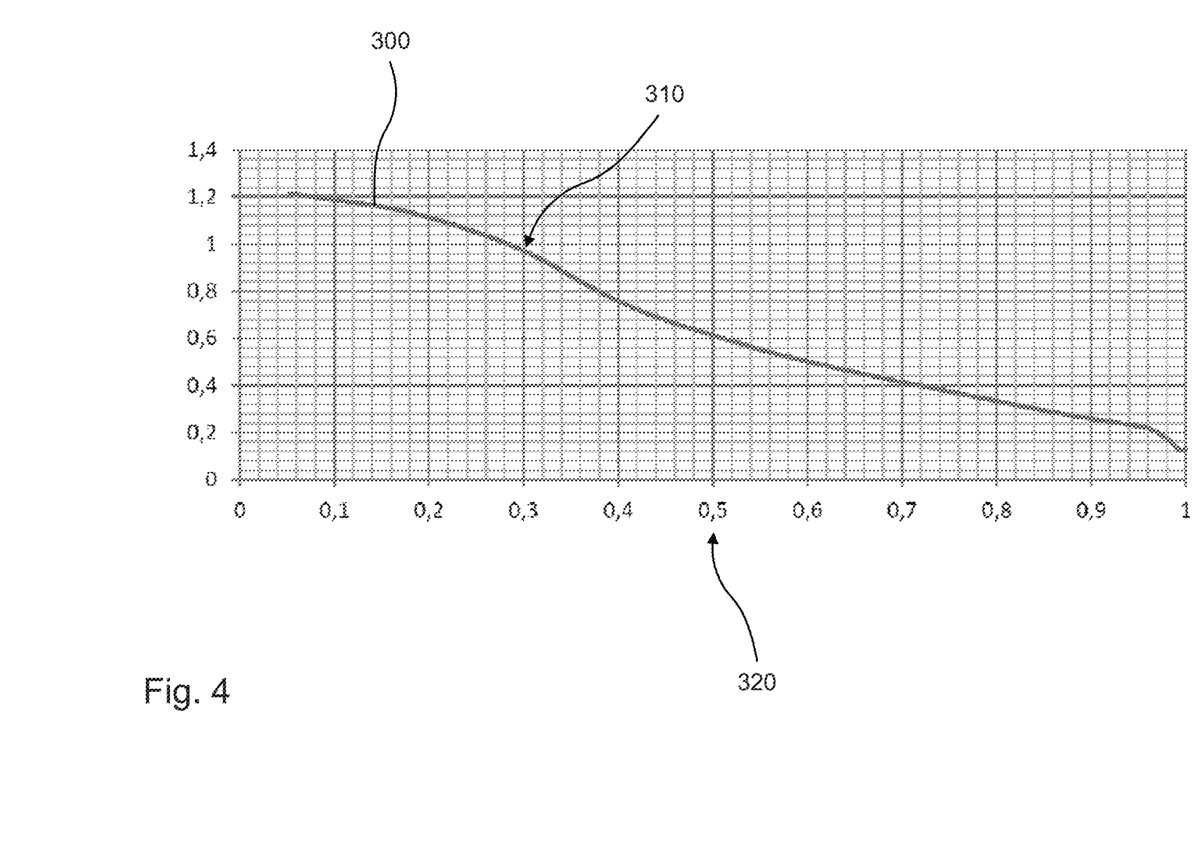
FIG. 4 shows a schematic and exemplary progression of a depth ratio over the blade length of rotor blades which is normalized with respect to the maximum rotor blade length.

The progression of the depth ratio 300 in FIG. 4 exhibits a decreasing progression along the longitudinal direction of the rotor blade, from the blade connection to the blade tip. In the illustrated diagram, the longitudinal extent of the rotor blade in the longitudinal direction is illustrated in a normalized representation so that a relative blade length of the rotor blade starting from the blade connection in a blade length value range between 0% to 100% is illustrated. In particular it is apparent that the depth ratio in a region 310 of the separating point in the region of a relative blade length of approximately 28% is equal to 1. The depth ratio TV is obtained, in particular, from the following function:

$$TV = \frac{t}{T_{separating\ point}}$$

In this context, t is the profile depth of the rotor blade 200 at a relative position $$x = \frac{r}{R}$$

of the rotor blade, where r represents the absolute distance of the relative position from the blade connection 202 and R represents the absolute overall length or the longitudinal extent of the rotor blade 200 in the longitudinal direction L. $T_{separating\ point}$ is the profile depth at the separating point.

Figure 5:
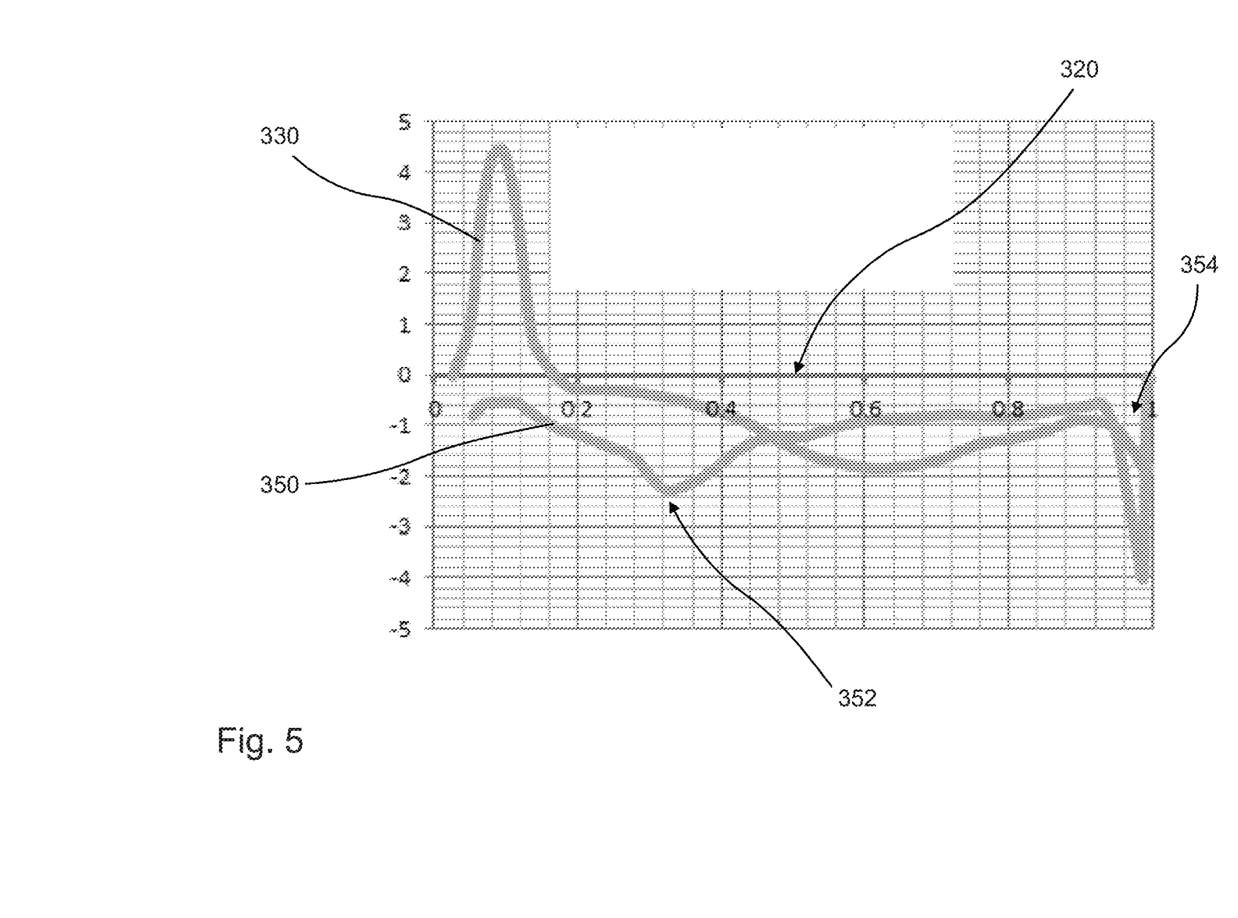
FIG. 5 shows schematic and exemplary progressions of development indices over the blade length of rotor blades which is normalized with respect to the maximum rotor blade length.

FIG. 5 illustrates two progressions of development indices. A first progression 330 represents the progression of a first development index for a conventional single-part rotor blade. The depth ratio whose gradient in the direction of the relative blade length is defined as the development index E is defined for the first progression 330 as a ratio of the variable profile depth and the profile depth at a hypothetical separating point in the region of a relative blade length of approximately 0.3 owing to a lack of an actual separating point in a single-part rotor blade.

The second progression 350 represents a progression of a second development index of a rotor blade. In particular it is apparent that in the region 352 of a separating point there is a local minimum of the development index. The value of the development index is even lower only in a region 354 of a blade tip, which is attributable to the specific formation of the blade tip or of the distal end of the rotor blade. The development index E results essentially from the gradient of the depth ratio in the direction of the relative blade length:

$$E = \frac{dTV}{dx} = \frac{d\left(\frac{t}{T_{separating\ point}}\right)}{d\left(\frac{r}{R}\right)}$$

In the second progression 350 it is also apparent that the development index in the region of the separating point lies in an index value range between −3 and −1. In particular, the development index in the region of the separating point lies in an index value range between −2.4 and −2.0. In a blade length value range between 50% and 90%, the development index has a rising value. Furthermore, it is apparent that the development index in the blade length value range between 25% and 50%, in particular in the blade length value range between 32% and 40%, is less than −1. The second progression 350 also has such a progression that in the blade length value range between 60% and 80% the development index lies in the development value range between −1.1 and −0.5.

The value of the development index also decreases from the relative blade length of 20%, in particular of 25%, toward the separating point. In addition, the development index increases from the separating point toward the relative blade length of 90%.

LIST OF REFERENCE SYMBOLS

100 Wind turbine
102 Tower
104 Nacelle
106 Rotor
108, 200 Rotor blade
109, 209 Separating point
110 Spinner
112, 212 Rotor blade section facing blade connection
114, 214 Rotor blade section facing away from blade connection
202 Blade connection
204 Blade tip
206 Leading edge
208 Trailing edge
210 Separating point profile depth
216 Suction side
218 Pressure side
300 Progression of depth ratio
310, 352 Region of separating point
320 Blade length value range
330 First progression of first development index
350 Second progression of second development index
354 Region of blade tip
D Rotor blade thickness
L Longitudinal direction
T Profile depth

The invention claimed is:

1. A rotor blade for a wind turbine, comprising:
a rotor blade body having a longitudinal length extending from a blade root to a blade tip and having a variable profile depth, wherein:
the rotor blade body is divided at a separating point and has a separating point profile depth at the separating point,
the rotor blade body has a blade length starting from the blade root to the blade tip and having blade length values ranging between 0% to 100%,
the separating point is arranged in a blade length value range between 25% and 50%,
a rotor blade section facing the blade root and a rotor blade section facing away from the blade root are connected together at the separating point and form the rotor blade body,
a depth ratio comprises the variable profile depth and the separating point profile depth,
a development index is defined as a gradient of the depth ratio in a direction of the longitudinal length of the rotor blade body, and
the development index in a region of the separating point is less than −1.

2. The rotor blade as claimed in claim 1, wherein the separating point is arranged in a blade length value range between 32% and 40%.

3. The rotor blade as claimed in claim 1, wherein the development index in the blade length value range between 25% and 50% is minimized in the region of the separating point.

4. The rotor blade as claimed in claim 1, wherein the development index in the region of the separating point lies in an index value range between −3 and −1.

5. The rotor blade as claimed in claim 1, wherein the blade length value range is between 60% and 80%, the development index lies in an index value range between −1.1 and −0.5.

6. The rotor blade as claimed in claim 1, wherein:
the development index decreases from a relative blade length of 20% toward the separating point, and
the development index increases from the separating point toward the relative blade length of 90%.

7. The rotor blade as claimed in claim 1, wherein:
the depth ratio in the blade length value range between 5% and 20% lies in a depth value range between 1.1 and 1.3,
the depth ratio in the blade length value range between 90% and 100% lies in the depth value range between 0.1 and 0.2, and
the depth ratio in the blade length value range between 40% and 70% lies in the depth value range between 0.4 and 0.75.

8. The rotor blade as claimed in claim 1, wherein a minimum thickness of the rotor blade in the region of the separating point is at least 1.7 meters.

9. The rotor blade as claimed in claim 1, wherein the longitudinal length of the rotor blade body is at least 40 meters.

10. The rotor blade as claimed in claim 1, wherein the development index in the blade length value range between 25% and 50% is less than −1.

11. The rotor blade as claimed in claim 1, wherein the development index in the blade length value range between 50% and 90% has a rising value.

12. A wind turbine comprising a rotor and at least one rotor blade as claimed in claim 1 coupled to the rotor.

13. A wind park comprising two or more wind turbines as claimed in claim 12.

14. A method comprising:
configuring a rotor blade that is divided in two, for a wind turbine, wherein the rotor blade extends from a blade root to a blade tip with a variable profile depth, wherein the rotor blade is divided in a longitudinal direction at a separating point and has a separating point profile depth at the separating point, wherein a relative blade length of the rotor blade, starting from the blade root, is defined in a blade length value range between 0% to 100%, wherein a rotor blade section facing the blade root and a rotor blade section facing away from the blade root are configured to be connected at the separating point for correct operation of the rotor blade, wherein a depth ratio comprising the variable profile depth and the separating point profile depth is defined, comprising:
specifying the separating point in the blade length value range between 25% and 50%, and
using a development index that is defined as a gradient of the depth ratio in the longitudinal direction of the relative blade length, wherein the development index in a region of the separating point is less than −1.

15. The method as claimed in claim 14, wherein the development index in the blade length value range between 25% and 50% is minimized in the region of the separating point.

16. The method as claimed in claim 14, wherein the development index:
   has a rising value in the blade length value range between 50% and 90%, and
   in the region of the separating point lies in an index value range between −3 and −1.

17. The method as claimed in claim 14, wherein in the blade length value range is between 60% and 80%, wherein the development index lies in an index value range between −1.1 and −0.5.

18. The method as claimed in claim 14, wherein the development index decreases from the relative blade length of 25% toward the separating point.

19. The method as claimed in claim 14, wherein the development index increases from the separating point toward the relative blade length of 90%.

* * * * *